United States Patent [19]

Coad

[11] Patent Number: 4,516,716
[45] Date of Patent: May 14, 1985

[54] METHOD OF BRAZING WITH IRON-BASED AND HARD SURFACING ALLOYS

[75] Inventor: Brian C. Coad, San Francisco, Calif.

[73] Assignee: GTE Products Corporation, Stamford, Conn.

[21] Appl. No.: 536,827

[22] Filed: Sep. 29, 1983

Related U.S. Application Data

[63] Continuation of Ser. No. 442,537, Nov. 18, 1982, abandoned.

[51] Int. Cl.³ ............................................... B23K 1/04
[52] U.S. Cl. ............................ 228/263.15; 219/85 H; 75/123 B; 75/123 L; 75/126 B; 75/126 P
[58] Field of Search .............. 228/194, 263.11, 263.14, 228/263.15, 56; 219/85 H, 129, 146.23; 420/586, 584

[56] References Cited

U.S. PATENT DOCUMENTS

| | | | |
|---|---|---|---|
| 3,736,128 | 5/1973 | Cadenet | 75/126 P |
| 3,836,358 | 9/1974 | Jones | 75/128 F |
| 4,402,742 | 9/1983 | Pattanaik | 75/128 F |

FOREIGN PATENT DOCUMENTS

| | | | |
|---|---|---|---|
| 53-35618 | 4/1978 | Japan | 75/123 B |
| 54-23020 | 2/1979 | Japan | 75/126 P |
| 148701 | 11/1980 | Japan | |
| 490861 | 2/1974 | U.S.S.R. | 75/128 F |

*Primary Examiner*—L. Dewayne Rutledge
*Assistant Examiner*—Debbie Yee
*Attorney, Agent, or Firm*—Donald R. Castle

[57] ABSTRACT

Alloys consisting essentially of controlled amounts of boron, controlled amounts of silicon, and at least one element selected from Cr, Ni, Mn, Mo, V, W, Cb, Ti and when present these elements are present in the following amounts by weight from 0% to about 35% by weight of Cr, from 0 to about 25% by weight of Ni, from 0 to 12% by weight of Mn, from 0 to 5% by weight of Mo, from 0 to 5% by weight of V, from 0 to 15% by weight of W, from 0 to 3% by weight of Cb and from 0 to 2% by weight of Ti, balance of the alloy is iron in amounts greater than 50%. Such alloys are satisfactory brazing and hard surfacing alloys.

6 Claims, No Drawings

METHOD OF BRAZING WITH IRON-BASED AND HARD SURFACING ALLOYS

This application is a continuation of application Ser. No. 442,537 filed Nov. 18, 1982 now abandoned.

FIELD OF INVENTION

This invention relates to a family of alloys which may be used to braze other ferrous-based alloys or to hard surface coat such alloys. More particularly it relates to iron based alloys which may be used in place of more expensive nickel-based brazing alloys.

BACKGROUND OF THE INVENTION

Nickel base alloys containing small amounts of iron, chromium, boron and silicon are known. Such alloys are standard brazing alloys having liquidus temperatures in the range of from about 1020° C. to about 1135° C. These alloys generally contain up to 4% by weight of iron, up to 4.5% by weight of silicon, up to about 4% by weight of boron and up to about 16.5% chromium. Such alloys are provided under AMS specification as 4776, 4777, 4778A, and 4779. The above-mentioned nickel alloys do not have a composition similar to the materials being brazed. Some of the advantages of brazing with an alloy having a composition similar to that of the components being brazed are:

(1) There is less probability of electro-chemical corrosion in the braze area.

(2) Expansion co-efficients are well matched, reducing stesses on heating and cooling of the brazed assembly.

(3) If assembly is heat-treated, as for example in a high strength steel, properties developed by heat treatment in the braze zone are similar to those in the bulk alloy.

The above advantages are particularly effective if the brazed assembly is subjected to a diffusion heat treatment to diffuse the melting-point-lowering elements into the bulk alloy of the assembly. The greatest advantages of such alloys lies in their lower cost, which extends the range of applications where brazing is an economic alterbative to other joining processes.

Additionally, U.S. Pat. No. 3,736,128 discloses a stainless steel alloy containing 20% to 30% Cr, up to 5% Ni, up to 3% Mn, up to 2% silicon, from about 2% to 6% B. Japanese patent 148,701 discloses a steel powder containing less than 1.5% Si, less than 2.0% Mn, 0.5% to 2.0% B, 2 to 22% Ni, 10 to 25% Cr, 0.5% to 4.0% Mo, balance iron.

SUMMARY OF THE INVENTION

In accordance with one aspect of this invention there is provided an alloy consisting essentially of specific limits of boron and of silicon, and at least one additional element selected from chromium, nickel, manganese, molybdenum, vanadium, tungsten, columbium and titanium, balance iron, wherein the iron is present in amounts greater than 50% by weight of said alloy. The level of the additional elements will be chosen to yield an alloy having the additional elements at approximately the same weight levels as those elements are present in the steels that are being brazed.

DETAILS OF THE PREFERRED EMBODIMENTS

For a better understanding of the present invention, together with other and further objects, advantages and capabilities thereof, reference is made to the following disclosure and appended claims in connection with the above description of some of the aspects of the invention.

While the preferred alloy compositions of this invention will have their liquidus in a range similar to that of nickel-base brazing alloys, that is, from about 1040° C. to about 1135° C., other alloys of higher liquidus, maybe preferred in some applications.

Alloys of the present invention are generally provided in the form of foil, strips, pastes, powders and the like. Powder metallurgy techniques known to those skilled in the art can be used to provide powders capable of being consolidated into foils, strips and the like. The powders can be used directly as hard surface coating or can be used directly in conventional vehicles as brazing pastes. If a brazing foil is desired it can be produced directly from the melt utilizing such process as the melt spinning technique or other equivalent methods such as the double roller chill wheel method and the like.

Boron is present in the alloys of this invention in an amount of from about 2% to about 6% by weight. Boron lowers the liquidus temperature of the alloys when added at these levels. Amounts of less than about 2% by weight do not effectively lower the liquidus temperature while amount above about 6% raises the liquidus temperature. Preferred levels of boron are from about 4% to about 6% by weight.

Silicon is present in the alloys of this invention in amounts of from about 5% to about 12% by weight. Silicon also lowers the melting point of iron. The preferred amount is from about 5% to about 10% by weight.

Chromium can be present in the alloys of this invention in amounts of up to about 35% by weight in order to impart corrosion resistance to the bond when the alloys of the present invention are used as brazes and to the coated external surface when the alloys of the present invention are used for hard surfacing. Chromium increases the melting point of the alloys of the invention.

Nickel can be added in amounts of up to about 25% by weight. Additional elements are present in the alloys to provide a composition match for the iron base alloys to be brazed. Thus an alloy to braze 410 stainless steel will contain from about 11% to about 13% by weight of chromium. An alloy to braze 304 stainless steel will contain from about 17% to about 19% by weight of chromium and from about 7% to about 9% by weight of nickel. An alloy to braze 18Cr-2Mo stainless steel will contain from about 17% to about 19% by weight of chromium and from about 1.5% to about 2.5% by weight of molybdenum. By the same principle, additional alloying elements may be present to match the compositions and the properites of other ferrous alloys it is desired to braze. Preferred compositions contain chromium in the range from about 10% to about 35% by weight and nickel in the range up to about 25% by weight in order to enhance corrosion resistance in general brazing applications.

Manganese when used is added up to about 12% by weight, vanadium, when present is used in amounts of up to about 5% by weight, molybdenum, in amounts up to about 5% by weight, tungsten, up to about 15% by weight, columbium, up to about 3% by weight and titanium up to about 2% by weight. These latter elements as well as nickel and chromium are used in amounts to approximate the percentage of these elements in the steels being brazed.

In order to more fully demonstrate the subject invention the following detailed example is presented. All parts, percentages and proportions are by weight unless otherwise indicated.

EXAMPLE 1

A fine powder alloy containing about 4% boron, about 5% silicon, about 16% chromium, about 22.5% nickel and about 52.5% iron is prepared using standard atomization techniques. A conventional brazing paste is prepared using the above powder.

A standard T-joint braze of 410 stainless steel is made at about 1100° C. in vacuum. Satisfactory melting and flowability are observed and a well-filled braze is observed.

EXAMPLE 2

A fine powder alloy comprising by weight about 6.0% boron, about 5.2% silicon, about 18.6% chromium, about 1.7% molybdenum, balance iron, is prepared using standard atomization techniques. This alloy is similar in composition to 18 chromium 2 molybdenum stainless steel. The alloy has a liquidus of about 1125° C. and a solidus of about 1060° C. as determined by differential thermal analysis.

A standard T-joint braze of the above 18 Cr 2Mo stainless steel is made at about 1150° C. in vacuum. The braze alloy flowed and wetted satisfactorily, and gave a good, well-filletted braze.

EXAMPLE 3

A fine powder alloy comprising by weight about 4.3% boron, about 5.3% silicon, about 17.8% chromium, about 9.9% nickel, about 10.2% manganese, balance iron, is prepared using standard atomization techniques. This alloy is similar in composition to 304 stainless steel. The alloy has a liquidus about of 1110° C. and a solidus of about 1030° C., as determined by differential thermal analysis.

A standard T-joint braze of 304 stainless steel is made at about 1150° C. in vacuum. The braze alloy flowed and wetted satisfactorily, and gave a good, well-filletted braze.

EXAMPLE 4

A fine powder alloy comprising by weight 4.25% boron, about 10.5% silicon, about 11.7% chromium, balance iron, is prepared using standard atomization techniques. This alloy is similar in composition to 410 stainless steel. The alloy had a liquidus of about 1115° C. and a solidus of 1100° C.

A standard T-joint braze of 410 stainless steel is made at about 1150° C. in vacuum. The braze alloy flowed and wetted satisfactorily, and gave a good, well-filletted braze.

EXAMPLE 5

A fine powder alloy comprising by weight about 4.2% boron, about 10.6% silicon, about 17.2% chromium about 10.3% nickel, balance iron, is prepared using standard atomization techniques. This alloy is similar in composition to 304 stainless steel. The alloy has a liquidus of about 1115° C. and a solidus of about 1065° C.

A standard T-joint braze of the above stainless steel is made at 1150° C. in vacuum. The braze alloy flowed and wetted satisfactorily, and gave a good, well-filletted braze.

While there has been shown and described what are at present considered the preferred embodiments of the invention, it will be obvious to those skilled in the art that various changes and modifications may be made therein without departing from the scope of the invention as defined by the appended claims.

What is claimed is:

1. A method of brazing two similar ferrous based alloys substrates comprising:
    (a) determining the chromium, nickel, manganese, molybdenum, vanadium, tungsten, columbium, and a titannium content of said ferrous based substrates.
    (b) providing brazing alloy consisting essentially of from about 2% to about 6% by weight of boron, from about 5% to about 12% by weight of silicon and at least one element selected from the group consisting of chromium, nickel, manganese, molybdenum, vanadium, tungsten, columbium and titanium, said elements, when present, being present in an amount of up to about 35% by weight of chromium, and in an amount of up to about 25% by weight of nickel, up to about 12% by weight of manganese, up to about 5% by weight of molybdenum, up to about 5% by weight of vanadium, up to about 15% by weight of tungsten, up to about 3% by weight of columbium and up to about 2% by weight of titanium, the balance of said alloy being iron in amounts greater than about 50% by weight of said alloy wherein said chromium, nickel, manganese, molybdenum, vanadium, tungsten, columbium and titanium are at approximately the same weight level as these elements are present in the ferrous based alloys substrate being brazed,
    (c) providing a mutual contact between said alloy and said substrates to achieve an assembly,
    (d) heating said assembly to at least the liquidus temperature of said brazing alloy for a sufficient time to achieve flow, and
    (e) cooling said brazed assembly to the ambient temperature.

2. A method according to claim 1, wherein said brazing alloy contains from about 10% to about 35% by weight of chromium.

3. A method according to claim 1, wherein said brazing alloy contains from about 11% to about 13% by weight chromium and said ferrous based alloy is 410SS.

4. An alloy according to claim 1, wherein said alloy is particularly suitable for brazing 304 stainless steel and contains from about 17% to 19% by weight of chromium and from about 75 to about 9% by weight of nickel.

5. A method according to claim 1, wherein said brazing alloy contains from about 17% to about 19% chromium and from about 1.5% to 2.5% by weight of molybdenum.

6. A method according to claim 1 wherein said brazing alloy contains from about 5% to about 10% silicon.

* * * * *